May 10, 1955 F. L. GAZZO 2,708,005
SEAT-CONTROLLED SAFETY CIRCUIT FOR MOTOR VEHICLES
Filed July 30, 1954 2 Sheets-Sheet 1

INVENTOR.
Franklin L. Gazzo
BY
McMorrow, Berman & Davidson
ATTORNEYS

May 10, 1955  F. L. GAZZO  2,708,005
SEAT-CONTROLLED SAFETY CIRCUIT FOR MOTOR VEHICLES
Filed July 30, 1954  2 Sheets-Sheet 2

INVENTOR.
Franklin L. Gazzo
BY
McMorrow, Berman & Davidson
ATTORNEYS

United States Patent Office 2,708,005
Patented May 10, 1955

2,708,005

SEAT-CONTROLLED SAFETY CIRCUIT FOR MOTOR VEHICLES

Franklin L. Gazzo, Hialeah, Fla.

Application July 30, 1954, Serial No. 446,763

4 Claims. (Cl. 180—82)

This invention relates to motor vehicle safety devices, and more particularly to an improved seat-controlled safety circuit for a motor vehicle of the type having an automatic transmission.

The main object of the invention is to provide a novel and improved seat-controlled safety circuit for a motor vehicle of the type having an automatic transmission provided with a controlling element which is movable into "neutral," "parking," and other positions, the improved circuit involving relatively simple components, being reliable in operation, and acting to prevent operation of the vehicle when the speed ratio selector lever is left in a forward or reverse range position with the engine running and with the driver's seat unoccupied.

A further object of the invention is to provide an improved seat controlled safety circuit for a motor vehicle of the type having an automatic transmission provided with a speed ratio selector lever which is movable into various positions, including a "neutral" and a "parking" position, the improved safety circuit involving inexpensive parts, being easy to install, and providing a means of positively stopping the engine of the vehicle when the driver leaves the driver's seat with the ratio selector lever in a position other than "neutral" or "parking."

Further objects and advantages of the invention will become apparent from the following description and claims, and from the accompanying drawings, wherein:

Figure 1:
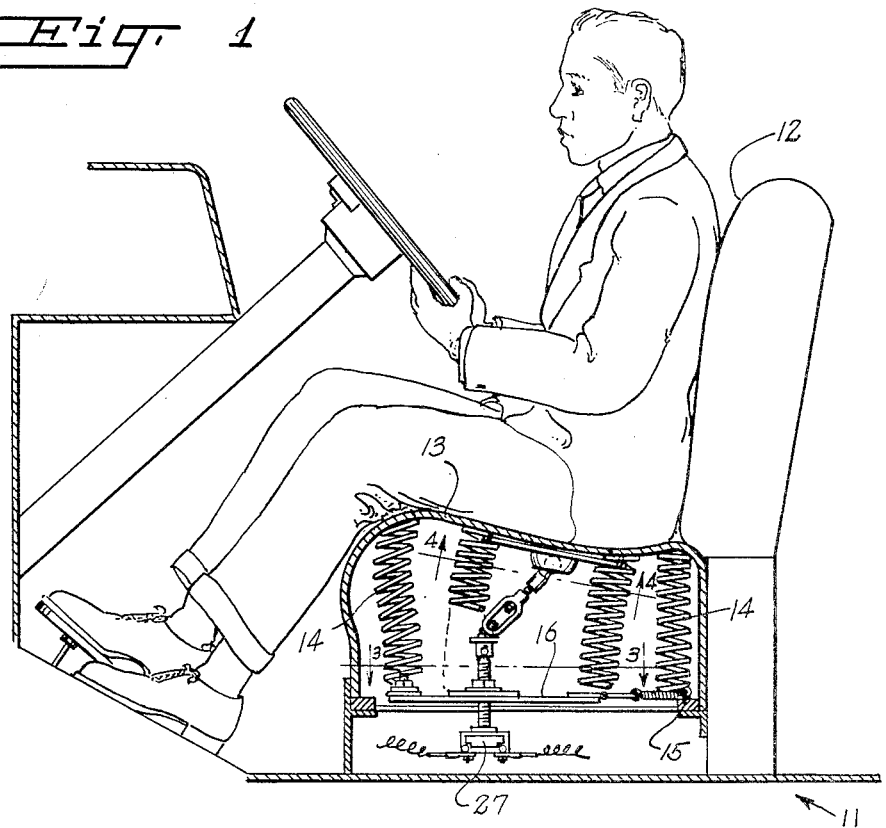
Figure 1 is a side elevational view, partly in vertical longitudinal cross section, of a portion of a motor vehicle provided with an improved seat controlled safety circuit according to the present invention, showing the seat controlled switch in an open position, in which it is maintained by the weight of the driver of the vehicle.

Referring to the drawings, 11 generally designates a conventional motor vehicle provided with the driver's seat 12, said driver's seat having the flexible main seat portion 13. The flexible seat portion 13 contains a plurality of springs 14 bearing between the rigid framework 15 of the seat and the flexible top portion thereof.

Designated at 16 is a rectangular, substantially flat frame which is hinged at one end to a bracket plate 17, the hinge being shown at 18. The bracket plate 17 is connected by a plurality of springs 19 to one of the transverse end elements 20 of the rigid lower portion 15 of the seat supporting frame, as is clearly shown in Figure 2. The opposite end of the flat frame 16 is engaged with and secured to the lower portions of a pair of seat springs 14, whereby the frame 16 assumes a substantially horizontal position, as shown in Figure 1, when a person occupies the seat, and assumes an inclined position, as shown in Figure 2, when the seat is unoccupied.

Figure 5:
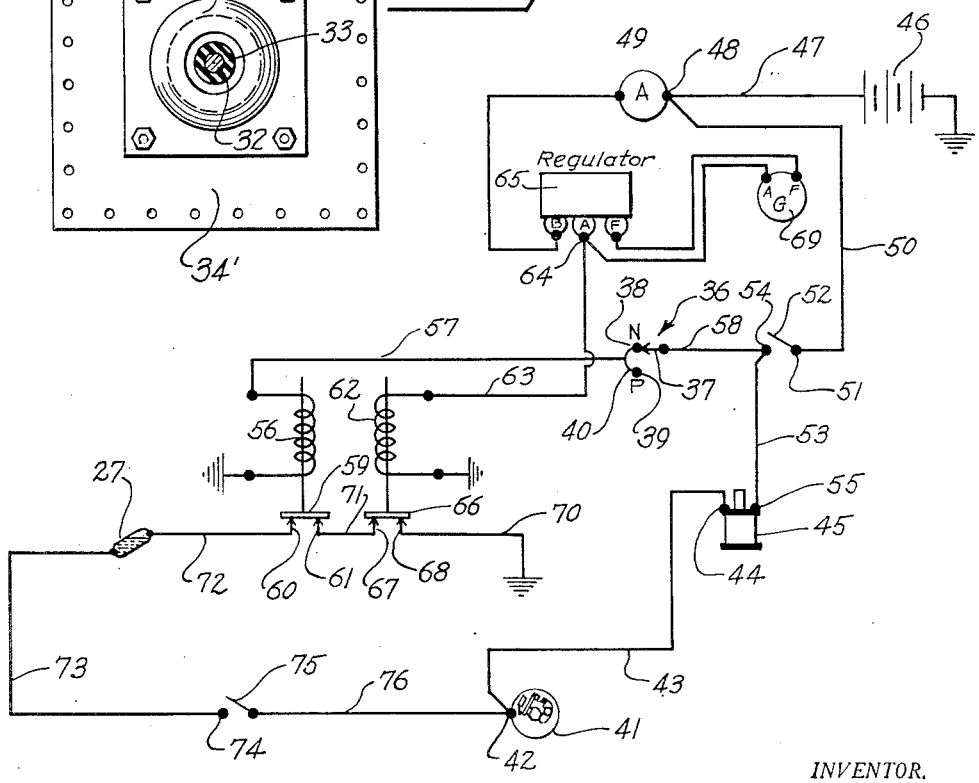
Figure 5 is a schematic wiring diagram of the improved safety circuit employed in accordance with the present invention, and illustrating the connections of the various elements of the safety circuit.

Designated at 21 is a transverse bar member which is adjustably secured to the longitudinal elements 22, 22 of the flat frame 16, as by bolts 23 extending through slots 24 formed in the frame members 22. As shown in Figure 5, the ends of the bar member 21 overlie the frame elements 24 and the bolts 23 extend through the end portions of the bar member 21 and through the slots 24, whereby the bar member 21 may be secured in a desired position along the frame 16.

Figure 2:
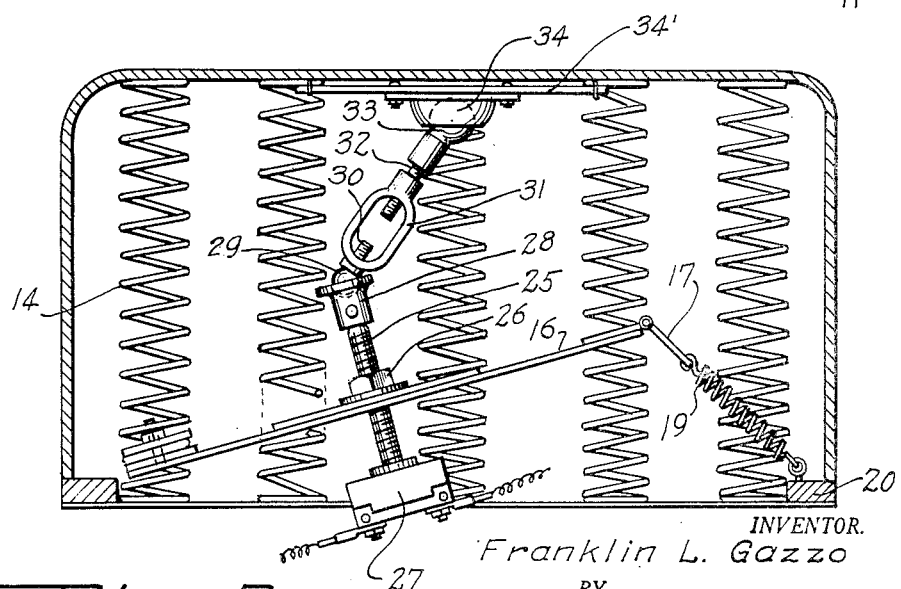
Figure 2 is an enlarged vertical longitudinal cross sectional view taken through the seat portion when the seat is unoccupied, showing the seat controlled switch in a closed position.
Figure 3:
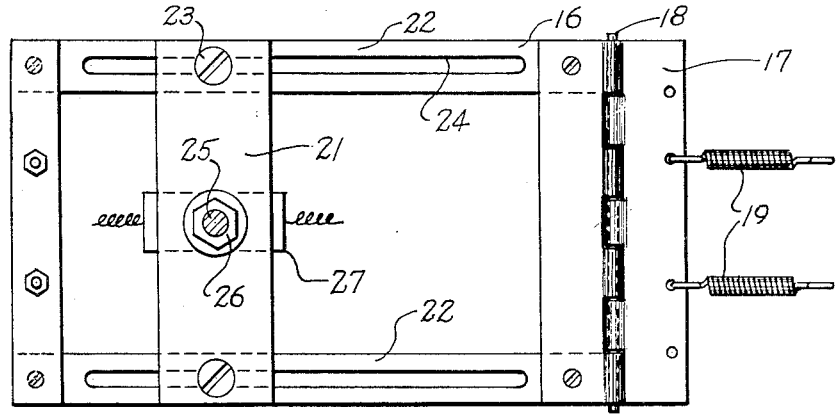
Figure 3 is an enlarged horizontal cross sectional view taken on the line 3—3 of Figure 1.
Figure 4:
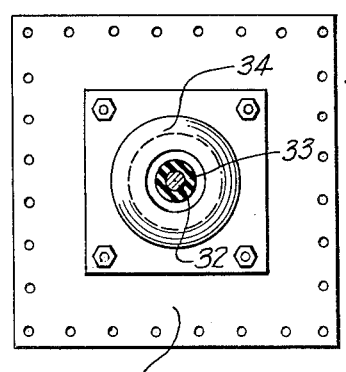
Figure 4 is an enlarged cross sectional view taken on the line 4—4 of Figure 1.

Extending centrally through the bar member 21 is a threaded shank 25 which is threadedly engaged with the bar member 21 and which may be locked in an adjusted position relative to the bar member 21 by a lock nut 26 engaged on the member 25, as shown in Figures 1, 2 and 4. Secured to the lower end of the member 25 is the micro switch 27. The top end of the member 25 is provided with a ball socket 28 in which is rotatably engaged for universal rotational movement the ball element 29 having the threaded shank 30.

Secured to the flexible top portion of the seat 13 is a rectangular plate 34' to which is fastened the ball socket 34. The shank 30 is threadedly engaged in one end of a turnbuckle link member 31. Threadedly engaged in the other end of said turnbuckle link member is the threaded shank 32 of a ball element 33 which is rotatably housed in the ball socket 34 for universal rotary movement therein. The shank members 30 and 32 are oppositely threaded, whereby the rotation of the link 31 in one direction causes the shank elements to be moved toward each other and rotation of the link member 31 in the opposite direction causes said shank elements to separate from each other, in the manner of the conventional turnbuckle. Thus, the micro switch 27 may be adjusted to allow for different seat measurements and switch overtravel. In the inclined position of Figure 2, the micro switch 27 is closed, whereas in its horizontal position, shown in Figure 1, said micro switch is open.

The ball member 33 preferably includes a main body portion of resilient deformable material, such as rubber or the like, to which is secured the threaded shank member 32, whereby the connection defined between the turnbuckle 31 and the socket 34 by the member 33 is sufficiently resilient to prevent the switch 27 from being operated by normal body movements of the driver or by normal shifting of the driver's body caused by vehicle movement.

Referring to Figure 5, 36 designates generally the speed ratio selector device of the automatic transmission of the vehicle, said device being provided with a controlling element, including the switch arm 37, which is movable in "neutral," "parking," and other positions. As will be understood, when the ratio selecting device is in its "neutral" or "parking" positions, the operator may leave the vehicle with the motor running with comparative safety, since the vehicle engine is not drivingly coupled to the vehicle wheels in these positions of the gear ratio selecting device. However, as will be readily understood, should the ratio selecting device be in other than the aforesaid positions, with the motor running, it would be extremely dangerous both to the occupants of the vehicle, to the vehicle operator, and to persons or property in the vicinity, should the operator leave the vehicle with the motor running.

The switch arm 37 is suitably connected to the speed ratio selector lever, so that when the lever is in a "neutral" position, the switch arm 37 engages a contact 38, and similarly, when the ratio selector lever is in a "parking" position, the switch arm 37 engages a contact 39, the contact 38 being connected to the contact 39 by a jumper wire 40, as shown in Figure 5. In any other position of the ratio selecting lever, the switch arm 37 is disengaged from the contacts 38 and 39.

Designated at 41 is the conventional distributor of the vehicle, said distributor having the low tension breaker terminal 42 which is connected by a wire 43 to the low tension coil terminals 44 of the ignition coil 45. The low tension winding of the coil 45 is energized from the vehicle battery 46 through a circuit including the battery wire 47, said wire being connected to the terminal 48 of the ammeter 49, a wire 50 extending from the terminal 48 to a first terminal 51 of the ignition switch 52, and a wire 53 connected between the remaining ignition switch terminal 54 and the battery terminal 55 of the ignition coil 45.

Designated at 56 is a first relay having one terminal thereof grounded and having its other terminal connected by a wire 57 to the jumper wire 40. The switch arm 37 is connected to the ignition switch terminal 54 by a wire 58.

The relay 56 is provided with the movable armature 59 which engages a pair of contacts 60 and 61 when relay 56 is de-energized, and disengages from the contacts 60 and 61 when the relay 56 is energized, as when the switch arm 37 engages either of the contacts 38 and 40, with the ignition switch 52 closed.

Designated at 62 is a second relay having one terminal thereof grounded and having the other terminal thereof connected by a wire 63 to the armature terminal 64 of the conventional voltage regulator 65 employed on the vehicle. The relay 62 is provided with the armature 66 engageable with a pair of contacts 67 and 68 when the relay is de-energized and disengageable from the contacts 67 and 68 when said relay is energized. The relay 62 is de-energized when less than a predetermined voltage is delivered by the vehicle generator 69, as when the engine of the vehicle is idling. When the engine speed is above a predetermined value, a sufficient current flows in the winding of the relay 62 to energize said relay and disengage the armature 66 thereof from the contacts 67 and 68, this condition occurring only when the engine is considerably above idling speed.

As shown in Figure 5, the relay terminal 68 is connected to ground by a wire 70. The contact 67 of the second relay 62 is connected by a wire 71 to the contact 61 of the first relay 56. The contact 60 of said first relay is connected by a wire 72 to one of the terminals of the micro switch 27. The other terminal of the micro switch is connected by a wire 73 to one terminal 74 of a manually operated switch 75, the other terminal of said switch being connected by a wire 76 to the low tension breaker terminal 42. As will be apparent from Figure 5, with the switch 75 in a closed position, the breaker terminal 42 will be grounded when the relays 56 and 62 are de-energized and when the seat controlled micro switch 27 is closed. This will occur when the driver's seat is unoccupied with either the switch arm 37 in other than a "neutral" or "parking" position, and with the engine operating at idling speed. Thus, if the operator of the vehicle leaves his seat with the engine operating and with the speed ratio selector lever in a forward or reverse range, namely, in a position other than "neutral" or "parking," the relays 56 and 62 will be deenergized and the micro switch 27 will close, completing the grounding circuit (assuming the manually controlled safety switch 75 to be closed), causing the ignition coil terminal 44 to be grounded, and thereby causing the engine to stop.

As soon as the driver returns to his seat, the switch 27 opens, allowing the engine to be re-started. When the engine is operating above idling speed at a value sufficient to energize the relay 62, the armature 66 disengages from the contacts 67 and 68, whereby the ignition grounding circuit is opened at the contacts 67 and 68. Similarly, said grounding circuit will be opened at the contacts 60 and 61 when the switch arm 37 is in the position corresponding to the "neutral" position of the ratio selector lever or in the "parking" position thereof.

As will be readily apparent, the safety circuit above described does not affect the normal operation of the vehicle at any time, and is further controllable at the option of the driver by the provision of the manually controlled safety switch 75, whereby the driver may eliminate this safety feature if he so desires by opening the switch 75.

While a specific embodiment of an improved seat controlled safety circuit for a motor vehicle of the type having an automatic transmission has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. A seat controlled safety circuit for a motor vehicle of the type having a driver's seat, an ignition system, and an automatic transmission provided with a controlling element movable into "neutral" and other positions comprising first switch means closed when said controlling element is in a "neutral" position and open in other positions, a relay controlled by said first switch means and being energized only when said switch means is closed, said relay having contacts which are open only when said relay is energized, second switch means mounted in the driver's seat of the vehicle and being closed when the seat is vacant and opened when the seat is occupied, and a circuit including said contacts and said switch means, connected so as to render the ignition system of the vehicle inoperative when the seat is vacant and the controlling element is in one of said other positions.

2. A seat controlled safety circuit for a motor vehicle of the type having a driver's seat, an ignition system including breaker points, and an automatic transmission provided with a controlling element movable into "neutral" and other positions comprising first switch means closed when said controlling element is in a "neutral" position and open in other positions, a relay controlled by said first switch means and being energized only when said switch means is closed, said relay having contacts which are open only when said relay is energized, second switch means mounted in the driver's seat of the vehicle and being closed when the seat is vacant and opened when the seat is occupied, and a circuit including said contacts and said second switch means connected across the breaker points of the ignition system of the vehicle, whereby said breaker points will be short circuited when the seat is vacant and the controlling element is in one of said other positions.

3. A seat controlled safety circuit for a motor vehicle of the type having a driver's seat, an ignition system, a generator, and an automatic transmission provided with a controlling element movable into "neutral" and other positions comprising first switch means closed when said controlling element is in "neutral" position and open in other positions, a relay controlled by said first switch means and being energized only when said first switch means is closed, said relay having contacts which are open only when said first relay is energized, an additional relay controlled by the generator of the vehicle and having contacts which are opened only when the vehicle motor is operating above idling speed, second switch means mounted in the driver's seat of the vehicle and being closed when the seat is vacant and open when the seat is occupied, and a circuit including said first-named contacts, said last-named contacts and said second switch means, connected so as to render the ignition system of the vehicle inoperative when the seat is vacant and the controlling element is in one of said other positions.

4. A seat controlled safety circuit for a motor vehicle of the type having a driver's seat, an ignition system including breaker points, a generator, and an automatic transmission provided with a controlling element movable into "neutral," "parking," and other positions comprising first switch means closed when said controlling element is in "neutral" and "parking" position and open in other positions, a relay controlled by said first switch means and being energized only when said first switch means is closed, said relay having contacts which are open only when said relay is energized, an additional relay controlled by the generator of the vehicle and having contacts which are open only when the vehicle motor is operating above idling speed, second switch means mounted in the driver's seat of the vehicle and being closed when the seat is vacant and opened when the seat is occupied, and a circuit including said first-named contacts, said last-named contacts and said second switch means, connected across the breaker points of the ignition system of the vehicle, whereby said breaker points will be short circuited when the seat is vacant and the controlling element is in one of said other positions.

References Cited in the file of this patent

UNITED STATES PATENTS

| | | |
|---|---|---|
| 2,015,834 | Banker | Oct. 1, 1935 |
| 2,459,938 | Higgins | Jan. 25, 1949 |
| 2,489,929 | Raybould | Nov. 29, 1949 |
| 2,606,626 | Meyer | Aug. 12, 1952 |
| 2,626,003 | Kutzer | Jan. 20, 1953 |
| 2,657,757 | Haynie | Nov. 3, 1953 |